United States Patent [19]

Gethöffer et al.

[11] Patent Number: 5,133,894

[45] Date of Patent: Jul. 28, 1992

[54] POLYMERS, PROCESS FOR THEIR PREPARATION AND THEIR USE AS BLEACH ACTIVATORS HAVING BUILDER PROPERTIES

[75] Inventors: Hanspeter Gethöffer, Frankfurt am Main; Gerd Reinhardt, Kelkheim; Dennis Miller, Eppstein/Taunus, all of Fed. Rep. of Germany

[73] Assignee: Hoechst Aktiengesellschaft, Frankfurt am Main, Fed. Rep. of Germany

[21] Appl. No.: 683,119

[22] Filed: Apr. 8, 1991

Related U.S. Application Data

[63] Continuation of Ser. No. 534,489, Jun. 5, 1990, abandoned.

[30] Foreign Application Priority Data

Jun. 7, 1989 [DE] Fed. Rep. of Germany ....... 3918525

[51] Int. Cl.$^5$ ................................................ C11D 3/37
[52] U.S. Cl. .......................... 252/174.23; 252/174.24; 252/174.25
[58] Field of Search ............. 252/174.23, 174.24; 526/240, 292.95, 312, 315, 318, 318.1, 318.3, 318.4, 318.43, 266, 174.25

[56] References Cited

U.S. PATENT DOCUMENTS

4,329,383  5/1982  Joh ........................ 428/36
4,415,490 11/1983  Joh ........................ 525/54.2

OTHER PUBLICATIONS

M. Sadamichi et al. (1969) J. Macromol, Sci.-Chem. A3, 845–852.

*Primary Examiner*—Joseph Schofer
*Assistant Examiner*—M. Nagumo

[57] ABSTRACT

Polymers composed of 5 to 100% by weight of one or more acylals of the formula I

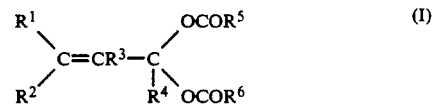

and 95 to 0% by weight of one or more unsaturated carboxylic acids of the formula II

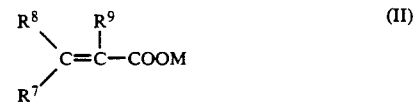

the symbols $R^1$, $R^2$, $R^3$, $R^4$, $R^5$, $R^6$, $R^7$, $R^8$, $R^9$ and M having the meanings given in the description. These polymers are suitable as bleach activators in detergent compositions and, at the same time, have a builder action.

16 Claims, 1 Drawing Sheet

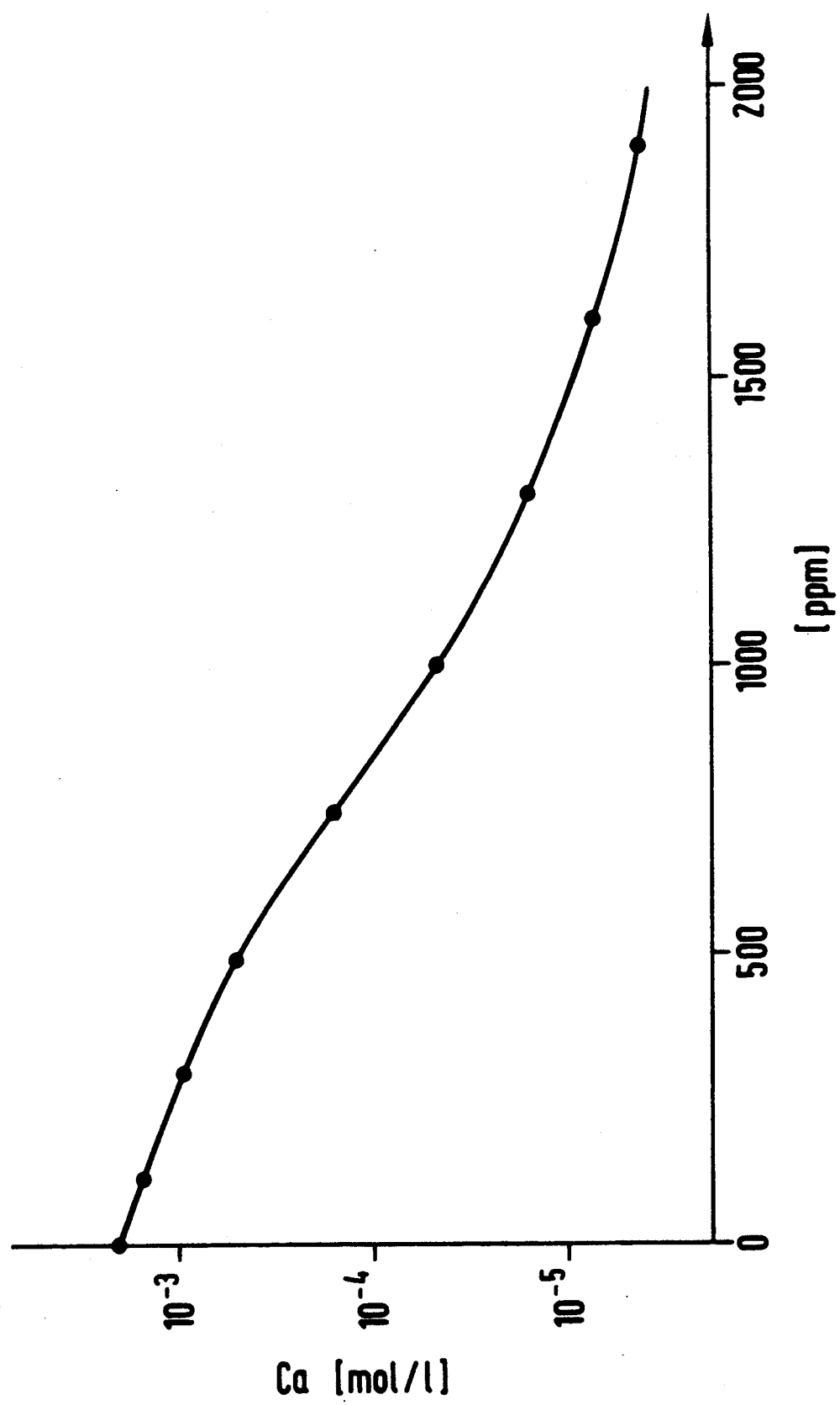

POLYMERS, PROCESS FOR THEIR PREPARATION AND THEIR USE AS BLEACH ACTIVATORS HAVING BUILDER PROPERTIES

CROSS REFERENCE TO RELATED APPLICATION

This is a continuation of our copending application Ser. No. 07/534,489, filed Jun. 5, 1990, now abandoned.

DESCRIPTION

Energy saving objectives, altered textile composition, and heightened environmental consciousness have brought about different washing conditions in the course of the last 20 years. For instance, tripolyphosphate, which has for years been successfully used as a builder, has been replaced by materials less harmful to the environment. The best known example of these is zeolite A.

Until now, no organic builder molecules have succeeded in becoming established for reasons of cost. Exceptions to this are the polymeric carboxylic acids such as polyacrylic acid or copolymers based on acrylic acid and maleic acid or maleic anhydride. These compounds may be used alone or in combination with zeolite or phyllosilicates. In these combinations, said compounds function as carriers for calcium and magnesium ions.

The reduction in the washing temperature can be considered as a consequence of the desire for energy saving.

The introduction of an activator/persalt-based bleaching system made a vital contribution to lowering the washing temperature from 90° C. to 40°-60° C. Among the numerous potential perborate activators described in the patent literature (for example U.S. Pat. No. 4,248,928), N- and O-acylated compounds such as tetraacetylethylenediamine (TAED), pentaacetylglucose (PAG), tetraacetylglycoluril (TAGU) and acyloxybenzenesulfonates have attracted commercial interest GB-B-836,988 has already claimed activators which are compounds having two ester functions on one carbon atom (referred to below as acylals). EP 125,781 describes similar compounds of this class such as ethylidene diacetate, ethylidene benzoate acetate and tetraacetylglutardialdehyde as effective perborate activators. DE 3,729,074 proposes liquid acylals as bleach components for liquid detergents. However, the acylal-based activators hitherto described have the disadvantage that the perhydrolysis products formed in addition to the peracids have no other function in the detergent liquor.

There is therefore a great need, in detergent and disinfectant compositions, for persalt activators which besides activating a per-compound through formation of a peracid, also have a washing action within the washing liquor.

It has now been found that polymers of unsaturated acylals with unsaturated organic carboxylic acids such as acrylic acid or methacrylic acid not only have persal-tactivating properties but are also effective as builder molecules within the washing liquor.

The present invention accordingly provides homo- and copolymers composed of 5 to 100% by weight of one or more acylals of the formula I

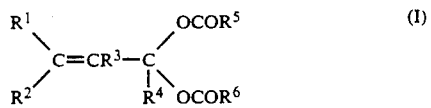

in which $R^1$ is hydrogen, $C_1$–$C_4$-alkyl, phenyl or a group of the formula

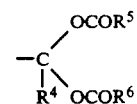

$R^2$ is hydrogen or $C_1$–$C_4$-alkyl,
$R^3$ is hydrogen, $C_1$–$C_4$-alkyl or phenyl,
$R^4$ is hydrogen, $C_1$–$C_4$-alkyl or phenyl,
$R^5$ and $R^6$, which in case may be identical or different, are hydrogen, $C_1$–$C_9$-alkyl, $C_2$–$C_9$-alkenyl or phenyl or
$R^5$ and $R^6$ together are $C_1$–$C_4$-alkylene, $C_2$–$C_4$-alkenylene or phenylene, and 95 to 0% by weight of one or more unsaturated carboxylic acids or salts thereof of the formula

in which $R^7$ is hydrogen, $C_1$–$C_4$-alkyl, phenyl or a group of the formulae —$C_1$–$C_4$-alkyl-COOM or —$C_6H_4$—COOM,
$R^8$ is hydrogen, $C_1$–$C_4$-alkyl, phenyl or a group of the formula —COOM
$R^9$ is hydrogen, $C_1$–$C_4$-alkyl, phenyl, hydroxyl, chlorine, bromine or a group of the formula —$C_1$–$C_4$-alkyl—COOM or —$C_6H_4$—COOM and
M is hydrogen, ammonium, an alkali metal atom or the equivalent of an alkaline earth metal atom, and also a process for the preparation of these polymers and their use as peroxide activators and builders in detergent and disinfectant compositions.

Preference is given to polymers of the type which are formed from an acylal of the formula I, where $R^1$ is hydrogen, methyl or phenyl, $R^2$ is hydrogen or methyl, $R^3$ is hydrogen or methyl, $R^4$ is hydrogen or $C_1$–$C_4$-alkyl, $R^5$ and $R^6$ are $C_1$–$C_9$-alkyl or phenyl, and an unsaturated carboxylic acid of the formula II, where $R^7$ is hydrogen, methyl, —COOM or phenyl, $R^8$ is hydrogen and $R^9$ is hydrogen or methyl and M has the meanings given above.

Particular preference is given to acylals of acrolein, of methacrolein, of crotonaldehyde and of cinnamaldehyde, particularly preferred carboxylic acids being acrylic acid and methacrylic acid.

Preferred polymers within the scope of the invention are copolymers of acrolein diacetate and acrylic acid, acrolein diacetate and methacrylic acid, acrolein dinonanoate and acrylic acid or more complex copolymers of acrolein diacetate with acrolein dinonanoate and acrylic acid, acrolein diacetate with acrolein dibenzoate and acrylic acid, and acrolein diacetate with acrolein dibenzoate, acrolein dinonanoate and acrylic acid. The advantage of these more complex copolymers is that various peroxocarboxylic acids are formed and these are complementary in their bleaching properties.

Preference is likewise given to copolymers of the type which contain 5 to 50 mol % of an acylal of the formula I and 95 to 50 mol % of an unsaturated carboxylic acid of the formula II.

FIG. 1 is a graph wherein the resulting curve represents the concentration of free calcium as a function of the polymer concentration illustrating the $Ca^{++}$ binding properties of polymers used in this invention.

The monomeric acylals of the formula I are prepared by diverse processes, which are known per se (cf. Houben-Weyl, Methoden der Organischen Chemie, Vol. VII/1, p. 442). These compounds are advantageously obtained by reacting an aldehyde or a dialdehyde with a carboxylic acid anhydride.

The polymerization can be carried out in bulk or in solution. Suitable solvents are toluene, xylene or other aprotic solvents. The polymerization reaction can be initiated using light, heat or customary free-radical initiators such as, for example, dibenzoyl peroxide or azoisobutyronitrile. The two components can be premixed or combined only after the reaction has commenced. The more reactive component is advantageously added dropwise during the reaction. The reaction temperature is governed by the reactivity of the components used, of the free-radical initiator and by the desired degree of polymerization. In general, reaction temperatures of 60° to 150° C. are adequate. Besides the preparation of copolymers of two monomers, it is also possible to prepare copolymers with a plurality of acylal monomers or a plurality of unsaturated carboxylic acid monomers.

After isolation, the polymers are obtained in the form of a white powder. They can be used directly in this form or be converted by granulation or agglomeration into a more durable form for storage.

Even at temperatures below 60° C., the claimed polymers in aqueous solutions and in combination with hydrogen peroxide release peroxocarboxylic acids which have a highly oxidizing and disinfectant action. In place of hydrogen peroxide, it is also possible to use the customary substitutes such as sodium perborate tetrahydrate, sodium perborate monohydrate, sodium percarbonate, sodium persulfate or sodium perphosphate, the corresponding potassium salts or hydrogen peroxide/urea adducts. Optional use of the persalt-activating properties of the polymers according to the invention is achieved by using a mole ratio of active acylal group to hydrogen peroxide of 1:0.5-2.5. It is assumed that during perhydrolysis, or after this has occurred, the carbonyl group which has been formed is oxidized to a carboxyl function. This results in more carboxyl groups being formed and the number of carboxyl units per polymer is accordingly increased. Furthermore, the claimed polymers, both in acylal form and also after perhydrolysis has been completed, prove to be very good builder molecules having good $CaCO_3$-dispersibility. In hard water, said polymers reinforce the washing action of calcium-sensitive surfactants.

The amounts of said polymers which are to be used in the detergent formulation are 1-50% by weight, preferably 1-20% by weight. These substances may also be used in combination with other builders or activators. In this respect, combinations with zeolites or phyllosilicates have proved particularly satisfactory. It is assumed that, in these combinations, the polymers according to the invention act as carriers, as described in the use of the prior-art copolymers of acrylic acid with maleic acid. The amounts of said polymers to be used in combination with zeolite or phyllosilicates is 0.5-20%, preferably 0.5-10%.

EXAMPLE 1

Copolymer of acrolein diacetate and acrylic acid 75 g (0.5 mol) of acrolein diacetate are dissolved in 200 g of toluene and heated to 50° C. After adding 1.5 g of dibenzoyl peroxide (50% strength in phthalate), the mixture is heated to 80° C. and, at this temperature, 36 g (0.5 mol) of freshly distilled acrylic acid are added dropwise in the course of 1 h. 30 minutes after the dropwise addition has ceased, the copolymer precipitates. During precipitation, the temperature increases to 95° C. Stirring is continued for a further 2 h at 80°-95° C., then the mixture is cooled to room temperature and the precipitate is filtered off under suction. After thorough washing with toluene, the precipitate is dried at 80° C. under water-pump vacuum to constant weight.

Yield:
46.6 g of white powder which is composed of
10 mol % of copolymerized acrolein diacetate and
90 mol % of copolymerized acrylic acid (400 MHz $^1$H-NMR)
$M_w$: 43,000 (light scattering)
Fikentscher K value: 38.3.

EXAMPLE 2

Copolymer of acrolein diacetate and methacrylic acid 316 g (2 mol) of acrolein diacetate are dissolved in 600 g of toluene and heated to 50° C. After adding 3 g of dibenzoyl peroxide (50% strength in phthalate), the mixture is heated to 80° C. and, at this temperature, 172.2 g (2 mol) of methacrylic acid are added dropwise in the course of 1 h 20 min. 10 min after dropwise addition has commenced, the copolymer has already begun to precipitate, and a slight increase in the temperature of the reaction mixture occurs, to 92° C. Stirring is continued for a further 2 h at 80° C., the mixture is cooled to room temperature and the precipitate filtered off under suction. After several thorough washings with toluene, the precipitate is dried at 100° C. under water-pump vacuum to constant weight.

Yield:
184 g of white powder which is composed of
8 mol % of copolymerized acrolein diacetate and
92 mol % of copolymerized acrylic acid (400 MHz $^1$H-NMR)
K-value: 28.9.

EXAMPLE 3

Copolymer of acrolein dipropionate and acrylic acid 182 g (1 mol) of acrolein dipropionate are dissolved in 300 g of toluene and heated to 50° C. After adding 1.5 g of dibenzoyl peroxide (50% strength in phthalate), the mixture is heated to 80° C. and 72 g (1 mol) of acrylic acid are added dropwise in the course of 1 h. Shortly after the dropwise addition has commenced, the copolymer begins to precipitate. During this precipitation, the temperature of the reaction mixture increases to 96° C. Stirring is continued for a further 3 h at 80°-95° C., the mixture is cooled to room temperature and the precipitate filtered off under suction. After thorough washing with toluene, the precipitate is dried at 80° C. under water-pump vacuum to constant weight.

Yield:
80.5 g of white powder which is composed of 8 mol % of copolymerized acrolein dipropionate and 92 mol % of copolymerized acrylic acid (400 MHz $^1$H-NMR)
K value: 45.4.

The unpolymerized acylal is recovered by distilling off the toluene and distilling the residue under oil-pump vacuum.

EXAMPLE 4

The binding of Ca++ by a polymer according to the invention was investigated using an ion-sensitive electrode. The measurements were carried out at 23° C. in a buffer composed of 0.03M NH$_4$Cl and 0.07M NH: (pH 9.5). An amount of NaOH sufficient to neutralize the polymer was added. In this experiment, the polymer concentration of the solution is expressed in terms of that of the sodium salt.

A constant calcium concentration (0.002M) was used. A calibration curve was used to compute the amount of free calcium from the electrode potential. The profile of the curve which represents the concentration of free calcium as a function of the polymer concentration is given in FIG. 1.

The fact that the concentration of free calcium can be reduced to a low value shows that the polymer binds calcium strongly. The calcium-binding power can be computed simply by extrapolating the ratio [bound calcium]/[polymer] to [polymer] →0. It follows from this that 1 g of polymer (sodium salt) can bind $3.7 \times 10^{-3}$ mol of calcium.

EXAMPLE 5

Washing experiments in the launder-o-meter (builder action)

The experiments were carried out in a launder-o-meter at 40° C. and for a washing time of 30 min. The surfactant used was 0.5 g/l of alkylbenzenesulfonate, the pH being adjusted to 10 using sodium hydroxide solution. The soiled test material used was in each case 4 strips of standard-soiling on cotton. The builders used were the copolymer PBA according to the invention as described in Example 1, an acrylic acid/maleic acid copolymer (Sokolan CP5) and nitrilotriacetic acid (NTA). The builder concentrations were 0; 0.25; 0.5; 0.75; 1.0; 1.5 and 2 g/l. The balance of 2 g/l was in each case made up using sodium sulfate. The builder action was determined as the increase in reflectance of the test fabrics. The evaluation was carried out in a conventional manner.

Reflectances:

| Builder | Builder concentration | | | | | | |
|---|---|---|---|---|---|---|---|
| | 0 | 0.25 | 0.5 | 0.75 | 1.0 | 1.5 | 2.0 |
| PBA | 44.5 | 44.8 | 45.0 | 47.2 | 48.8 | 54.2 | 55.0 |
| NTA | 44.2 | 44.0 | 44.8 | 45.8 | 48.4 | 55.3 | 55.1 |
| CP 5 | 43.8 | 44.0 | 45.1 | 47.9 | 54.9 | 55.2 | 54.8 |

The results show that the builder action of the copolymer (PBA) according to the invention is comparable with that of NTA.

EXAMPLE 6

Washing experiments in the launder-o-meter (bleaching action)

The experiments were carried out at 40° and 60° C. in the launder-o-meter, the test stains used being tea on WFK-cotton and red wine on EMPA-cotton. The water hardness was 0° German hardness and the washing time was 30 min. The detergent used was 1.5 g/l of IEC-detergent. The bleaching system used was a) 900 mg/l of sodium perborate tetrahydrate, b) 900 mg/l of sodium perborate tetrahydrate and 220 mg/l of tetraacetylethylenediamine (TAED) and c) 900 mg/l of sodium perborate tetrahydrate and 700 mg/l of the polymeric builder-activator (PBA) according to the invention as described in Example 1.

The bleaching efficiency was determined as the increase in reflectance of the various test fabrics. The evaluation was carried out in a conventional manner.

| I) Water hardness: 0° German hardness | | | | |
|---|---|---|---|---|
| | Reflectances | | | |
| | Tea | | Red wine | |
| Bleaching system | 40° C. | 60° C. | 40° C. | 60° C. |
| Perborate | 60.3 | 61.9 | 52.4 | 54.6 |
| TAED/perborate | 72.5 | 77.4 | 64.6 | 67.6 |
| PBA/perborate | 69.7 | 75.6 | 60.4 | 62.4 |

| II) Water hardness: 23° German hardness | | | | |
|---|---|---|---|---|
| | Reflectances | | | |
| | Tea | | Red wine | |
| Bleaching system | 40° C. | 60° C. | 40° C. | 60° C. |
| Perborate | 47.7 | 46.7 | 51.2 | 55.5 |
| TAED/perborate | 65.2 | 69.8 | 61.5 | 68.1 |
| PBA/perborate | 67.0 | 73.1 | 59.1 | 66.4 |

We claim:
1. A method of making a detergent composition wherein a polymer comprised of an ethylenic addition product of the monomers comprising 5 to 100% by weight of one or more acylals of the formula I

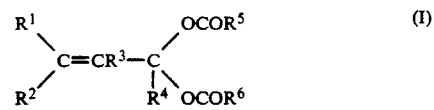

in which
R$^1$ is hydrogen, C$_1$-C$_4$-alkyl, phenyl or a group of the formula

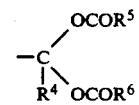

R$^2$ is hydrogen or C$_1$-C$_4$-alkyl,
R$^3$ is hydrogen, C$_1$-C$_4$-alkyl or phenyl,
R$^4$ is hydrogen, C$_1$-C$_4$-alkyl or phenyl,
R$^5$ and R$^6$, which in each case may be identical or different, are hydrogen, C$_1$-C$_9$-alkyl, C$_2$-C$_9$-alkenyl or phenyl or R$^5$ and R$^6$, together are C$_1$-C$_4$-alkylene, C$_2$ cis-alkenylene or 1,2-phenylene, and 95 to 0% by weight of one or more unsaturated carboxylic acids or salts thereof of the formula II

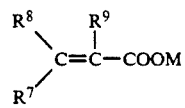

in which $R^7$ is hydrogen, $C_1$-$C_4$-alkyl, phenyl or a group of the formulae —$C_1$-$C_4$-alkyl-COOM or —$C_6H_4$—COOM, $R^8$ is hydrogen, $C_1$-$C_4$-alkyl, phenyl or a group of the formula —COOM $R^9$ is hydrogen, $C_1$-$C_4$-alkyl, phenyl, hydroxyl, chlorine, bromine or a group of the formula —$C_1$-$C_4$-alkyl—COOM or $C_6H_4$—COOM and M is hydrogen, ammonium, an alkali metal or one equivalent of an alkaline earth metal is used in combination with the other detergent composition ingredients as a bleach activator compound or as a builder or as both a bleach activator compound and a builder.

2. The method as claimed in claim 1, wherein, in the acylals of the formula 1, $R^1$ is hydrogen, methyl or phenyl, $R^2$ is hydrogen or methyl, $R^3$ is hydrogen or methyl, $R^4$ is hydrogen or $C_1$-$C_4$-alkyl, $R^5$ and $R^6$ are $C_1$-$C_9$-alkyl or phenyl and, in the unsaturated carboxylic acids of the formula II, $R^7$ is hydrogen, methyl, —COOM or phenyl, $R^8$ is hydrogen and $R^9$ is hydrogen or methyl and M has the meanings given in claim 1.

3. The method as claimed in claim 1, in which said monomers are comprised of 5 to 50% by weight of one or more acylals of the formula I and 95 to 50% by weight of one or more unsaturated carboxylic acids of the formula II.

4. A method as claimed in claim 1, wherein said detergent composition comprises of 1 to 50% by weight, of said polymer.

5. A method as claimed in claim 1, wherein said detergent composition comprises of 1-20% by weight of said polymer.

6. A method as claimed in claim 1, wherein said polymer is used in combination with zeolites and phyllosilicates.

7. A method as claimed i claim 6, in which the amount of said polymer used in combination with zeolites or phyllosilicates is 0.5-20% by weight.

8. A method as claimed in claim 1, in which the amount of said polymer used in combination with zeolites of phyllosilicates is 0.5-10% by weight.

9. A detergent composition comprising 0.5% to 50% by weight of a polymer comprised of an ethylene addition product of the monomers comprising 5% to 100% by weight of one or more acylals of the formula I

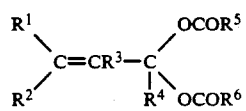

in which $R^1$ is hydrogen, $C_1$-$C_4$-alkyl, phenyl or a group of the formula

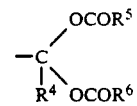

$R^2$ is hydrogen or $C_1$-$C_4$-alkyl, $R^3$ is hydrogen, $C_1$-$C_4$-alkyl or phenyl, $R^4$ is hydrogen, $C_1$-$C_4$-alkyl or phenyl, $R^5$ and $R^6$, which in each case may be identical or different, are hydrogen, $C_1$-$C_9$-alkyl, $C_2$-$C_9$-alkenyl or phenyl or $R^5$ and $R^6$, together are $C_1$-$C_4$-alkylene, $C_2$ cis-alkenylene or 1,2-phenylene, and 95 to 0% by weight of one or more unsaturated carboxylic acids or salts thereof of the formula II

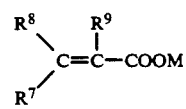

in which $R^7$ is hydrogen, $C_1$-$C_4$-alkyl, phenyl or a group of the formulae —$C_1$-$C_4$-alkyl-COOM or —$C_6H_4$—COOM, $R^8$ is hydrogen, $C_1$-$C_4$-alkyl, phenyl or a group of the formula —COOM $R^9$ is hydrogen, $C_1$-$C_4$-alkyl, phenyl, hydroxyl, chlorine, bromine or a group of the formula —$C_1$-$C_4$—alkyl-COOM or $C_6H_4$—COOM and M is hydrogen, ammonium, an alkali metal or one equivalent of an alkaline earth metal per mole of salt of formula II.

10. A detergent composition comprising a bleaching system consisting essentially of sodium perborate and the polymer of claim 1.

11. A detergent composition as claimed in claim 9, wherein the amount of said polymer is 1 to 20% by weight of the detergent composition.

12. A detergent composition as claimed in claim 9, wherein said composition further comprises a zeolite or a phyllosilicate, and the amount of said polymer is 0.5-20%.

13. A detergent composition as claimed in claim 9, wherein said composition further comprises a persalt which is activated by said polymer.

14. A detergent composition comprising:
(a) as the bleach activator compound or builder or builder/bleach activator compound, the polymerized reaction product of the monomers comprising:
5 to 100% by weight of one or more acylals of the formula I

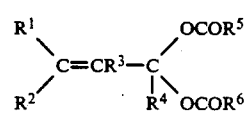

in which $R^1$ is hydrogen, $C_1$-$C_4$-alkyl, phenyl or a group of the formula

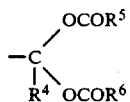

$R^2$ is hydrogen or $C_1$-$C_4$-alkyl,
$R^3$ is hydrogen, $C_1$-$C_4$-alkyl or phenyl,
$R^4$ is hydrogen, $C_1$-$C_4$-alkyl or phenyl,
$R^5$ and $R^6$, which in each case may be identical or different, are hydrogen, $C_1$-$C_9$-alkyl, $C_2$-$C_9$-alkenyl or phenyl or $R^5$ and $R^6$, together are $C_1$-$C_4$-alkylene, $C_2$ cis-alkenylene or 1,2-phenylene, and 95 to 0% by weight of one or more unsaturated carboxylic acids or salts thereof of the formula II

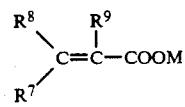

in which $R^7$ is hydrogen, $C_1$-$C_4$-alkyl, phenyl or a group of the formulae —$C_1$-$C_4$—alkyl—COOM or —$C_6H_4$—COOM, $R^8$ is hydrogen, $C_1$-$C_4$-alkyl, phenyl or a group of the formula —COOM $R^9$ is hydrogen, $C_1$-$C_4$-alkyl, phenyl, hydroxyl, chlorine, bromine or a group of the formula —$C_1$-$C_4$—alkyl—COOM or $C_6H_4$—COOM and M represents hydrogen, ammonium, an alkali metal or one equivalent of an alkaline earth metal per mole of salt of formula II, and (b) a surfactant, an additional builder, an additional bleach activator compound, or a bleaching agent.

15. A detergent composition as claimed in claim 14, wherein said component (b) comprises a bleaching agent, and wherein the bleaching agent is sodium or potassium perborate, percarbonate, persulfate, or perphosphate or hydrogen peroxide or a hydrogen peroxide/urea adduct.

16. A detergent composition as claimed in claim 14, wherein said composition comprises a bleaching system comprising said polymerized reaction product and sodium perborate.

* * * * *